United States Patent [19]

Brown

[11] Patent Number: 4,696,482
[45] Date of Patent: Sep. 29, 1987

[54] JAW LOCKING MEANS FOR CHUCKS

[75] Inventor: Lawrence H. Brown, Ambler, Pa.

[73] Assignee: L. H. Brown, Inc., Ambler, Pa.

[21] Appl. No.: 907,329

[22] Filed: Sep. 15, 1986

[51] Int. Cl.⁴ ............................................. B23B 31/10
[52] U.S. Cl. .................................. 279/1 SJ; 279/1 R; 279/123
[58] Field of Search .................. 279/1 R, 1 L, 1 SJ, 279/1 S, 110, 111, 123; 51/217 R, 217 T, 237 R; 33/181 R; 408/241 R

[56] References Cited

U.S. PATENT DOCUMENTS 2,925,282  2/1960  Borsetti ............................. 279/1 SJ
3,160,042 12/1964  Grand ............................. 279/1 SJ X
3,594,960  7/1971  Fourquier ....................... 279/1 R X
4,041,612  8/1977  Skubic ............................. 279/1 SJ X
4,223,898  9/1980  Righi ................................... 279/1 R Primary Examiner—Gil Weidenfeld
Assistant Examiner—Glenn L. Webb
Attorney, Agent, or Firm—Joseph W. Molasky & Assocs.

[57] ABSTRACT

A lock ring device for locking the soft jaws of a lathe chuck or the like for holding the jaws during the machining thereof to fit a workpiece to be held by the jaws, the device being adjustable to adjust the jaws in the locking position for the exact amount of metal removal desired.

6 Claims, 3 Drawing Figures

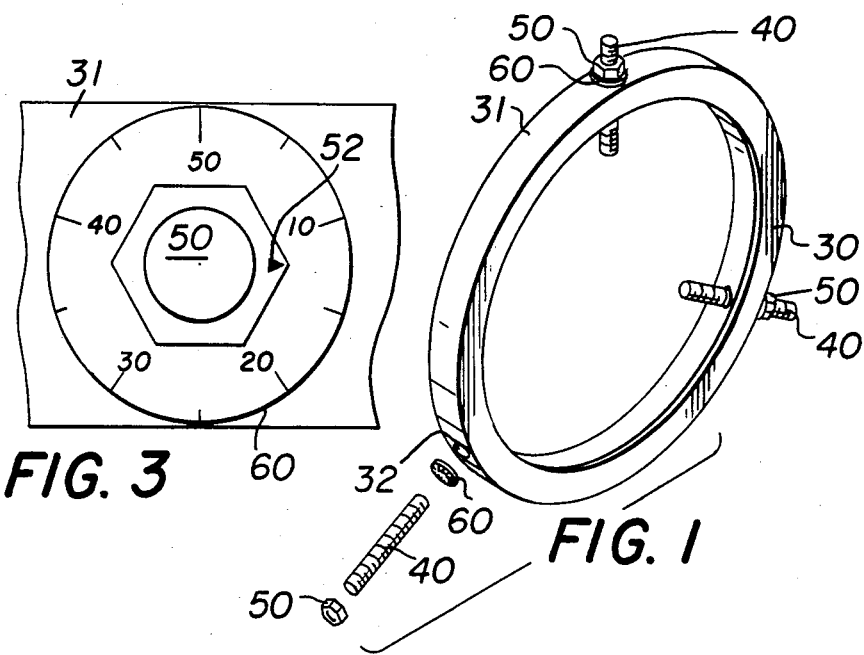
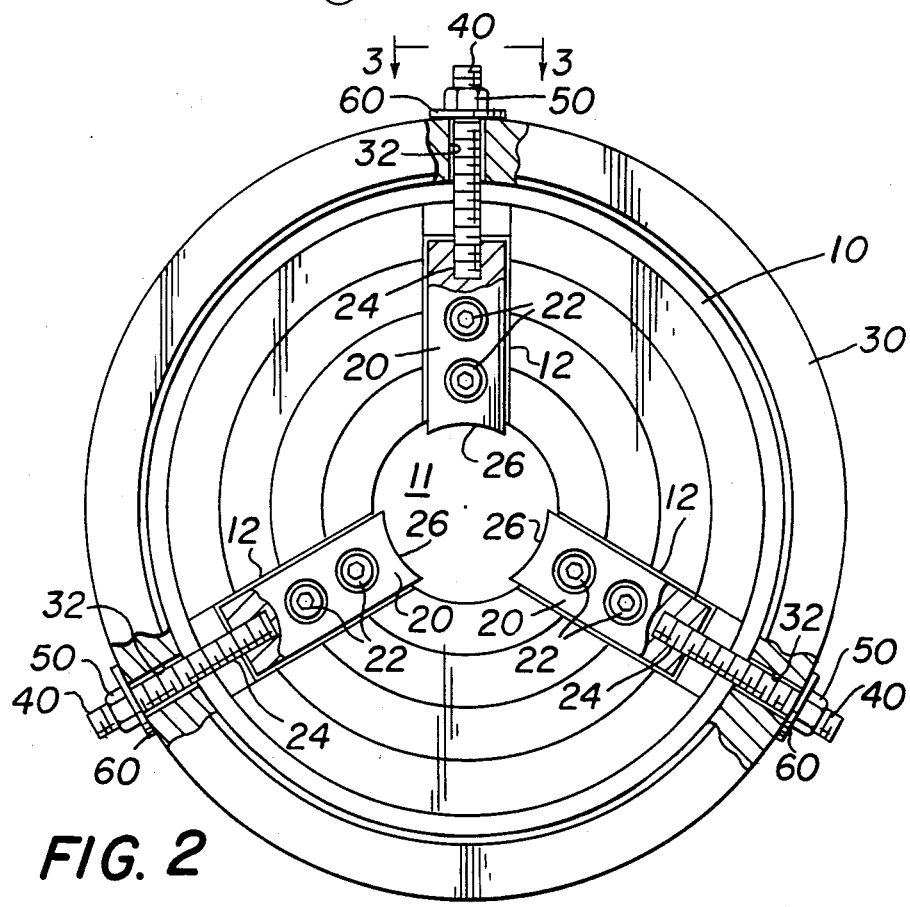

4,696,482

JAW LOCKING MEANS FOR CHUCKS

BACKGROUND AND SUMMARY OF THE INVENTION

This invention relates to means for locking the soft jaws of a chuck, such as a lathe chuck or the like, during the procedure for machining the jaws to fit the workpiece to be held by the jaws of the chuck.

In three-jaw lathe chucks, each soft jaw is secured on top of a hard jaw of the chuck and all the soft jaws can be machined by the rotation of the chuck mounted on the spindle of the lathe. Within the past ten years, the computer numerical controlled turning centers have come into widespread use worldwide. Such devices are extremely accurate and produce parts faster and with much better finish than was heretofore possible. The introduction of these devices caused chuck manufacturers to make chucks which require much greater holding pressure per jaw. For example, most of the power chucks available today are hydraulic and involve a holding pressure per jaw which could exceed 10,000 p.s.i. This high pressure is required to hold the parts of the jaws securely so as to withstand the high RPM of the computer numerical controlled machining centers in use today.

However, there are no devices available in the prior art that can lock the soft jaws for the purpose of machining the jaws to fit the workpiece at full chuck pressure and that provides for adjustment of the jaws in locking position for the exact amount of metal removal desired.

A satisfactory locking device of the indicated type must be able to make accurate adjustment for the purpose of machining the exact amount of metal from the jaws so that the jaws fit the workpiece to be held thereby within a tolerance of plus or minus 0.0005 inches, and must be able to stop the jaws within the movement of the chuck attaining the maximum jaw pressure that can be delivered by the chuck. Further, such a device should enable the operator to use a setup method that requires a minimum of time and that eliminates the need to machine steel plugs or the use of spiders, which method could reduce the average setup time from 1.5 hours to 15 minutes. Further, such a device must provide some means for the operator to know how much metal he is going to remove during a jaw machining operation. Furthermore, the device must be able to stop the jaws in measured thousandths of an inch. Also, the device must be safe at all times and must be retained securely on the chuck during the machining operation. Furthermore, the device must allow the operator to machine the front of the jaws as well as the internal diameter and be able to bore completely through all of the jaws, typically three.

It is the general object of the invention to provide a jaw locking device which achieves all the requirements set forth immediately above. Briefly stated, the jaw locking device in accordance with the invention comprises a ring adapted to be arranged to encircle the soft jaws, the ring having radially extending holes adapted to be aligned with the axis of radial movement of said soft jaws. The device also includes a plurality of studs, with one stud being secured to and extending outwardly from each of the soft jaws along the axis of radial movement thereof. Each stud extends through an associated radial hole in the ring to extend radially outwardly from the outer surface of the ring and is provided with an externally threaded portion extending outwardly of the ring. The device also includes a plurality of nuts, one nut being threadedly engaged on the threaded portion of said studs. In accordance with the invention the nuts are adjustable axially along the studs to a position to limit the radial inward movement of the soft jaws to thereby locate said soft jaws at a desired position for the machining of the workpiece engaging surfaces on said soft jaws.

PRIOR ART

There is a jaw positioning device in use today, this device being referred to as a top jaw forming device. The prior art device comprises a ring provided with axially extending prongs that are inserted into counterbores formed in the top jaws of the chuck. The ring is not secured to the top jaw so that it could slip out of the counterbore thereby presenting a possibility of injury to the operator. Moreover, the jaw is not adjustable and is relatively high in cost.

By way of marked contrast, the jaw locking means of the invention is securely engaged to the chuck jaws and could not slip off of the chuck thereby providing a much safer arrangement. Moreover, the jaws can be locked to full hydraulic pressure. Furthermore, with the device of the present invention the jaw locking ring can be adjusted in very small amounts for removing the exact amount of metal from the jaws whereby the jaws fit very accurately on the part to be held by the jaws. Also, the jaw locking means of the present invention is less expensive than the prior art device.

BRIEF DESCRIPTION OF THE DRAWINGS

FIG. 1 is a perspective view showing the jaw locking means in accordance with the invention.

FIG. 2 is a front elevational view showing the jaw locking means of the invention in engagement with the soft jaws of a three-jaw lathe chuck.

FIG. 3 is a fragmentary sectional view taken on line 3—3 of FIG. 2.

DETAILED DESCRIPTION OF THE PREFERRED EMBODIMENT

Referring to FIG. 2, there is shown a three-jaw lathe chuck having a chuck body 10 formed of a one-piece steel casting and provided with means, such as a tapered recess in its rear face, for mounting the chuck on the spindle (not shown) of the lathe. The chuck body 10 and the operating components thereof for effecting simultaneous gripping action by the three chuck jaws (i.e., the jaw setting means) are of an entirely conventional construction and for this reason will be described briefly herein. The construction and operation of the jaw setting means is well understood by those skilled in the art. One example of a jaw setting means for a precision chuck jaw is shown in U.S. Pat. No. 2,777,704. While various chuck jaw setting means may be provided, the means described in said patent comprises a jaw actuating plunger supported for reciprocation axially of the chuck and located within the central bore 11 formed in the chuck body 10. The plunger effects simultaneous gripping action of the jaws upon a workpiece through suitable means such as bell cranks or operating levers which are mounted on pivot shafts and connect the plunger to the master or hard jaws 12, respectively. The hard jaws 12 are retained in radial guideways by conventional rabbeted construction as is well known in the art. The plunger is caused to reciprocate by suitable means to effect a simultaneous radial movement of the hard jaws relative to the central axis of the chuck. As discussed above, many chucks in use today are provided with hydraulically operated power means for providing a holding pressure per jaw which could exceed 10,000 p.s.i.

The three soft jaws 20 (also known in the art as top jaws) are securely bolted on top of the hard jaws 12 by means of a pair of bolts 22.

As stated above, the foregoing structure is entirely conventional and is provided on all existing chucks. By means of the jaw locked means in accordance with the invention, the soft jaws 20 are locked for the purpose of machining the same to fit the workpiece to be held thereby at full chuck pressure.

The jaw locking means of the invention comprises a ring 30 made of a material of sufficient size and strength to hold the jaw tension of a power hydraulic chuck, or any other chuck with which it is to be used. By way of example, ring 30 may be made of 1020 steel. Ring 30 is adapted to be arranged to encircle the soft jaws 20 of the chuck and is provided with three radially extending holes 32 equally spaced (120° apart) circumferentially around ring 30. The holes 32 are aligned with the axis of radial movement of the soft jaws 30 for a purpose to be described hereafter.

The jaw locking means of the invention also comprises three studs 40, one stud 40 being associated with each soft jaw 20 and being secured thereto to extend radially outwardly therefrom along the radial axis of movement thereof. To this end, the studs 40 are externally threaded throughout their entire length and are engaged in threaded bores 24 in the outer end of the soft jaws 20 to a set position, as by being bottomed out in said bores 24. The holes 32 are drilled through the ring 30 to provide clearance for the threaded studs 40 to pass readily therethrough. Studs 40 are all the same length and are secured in bores 24 to extend from the outer ends of soft jaws 20 the same distance.

The jaw locking means of the invention also comprises three nuts 50, each nut 50 being adapted to be threadedly engaged on one of said studs 40 at the outwardly projecting threaded portion thereof as shown in FIG. 2. The nuts 50 are adjustable along the length of the studs 40 to position, or limit the radial movement of, the soft jaws 20 so as to locate said soft jaws 20 at a desired position for the machining of the workpiece engaging surfaces 26 of said soft jaws 20 as will be described hereafter.

There are also provided three annular discs 60 having a circular scale formed on the outer surface thereof, each nut 50 being provided with a disc 60 spot welded on the inner surface thereof as is shown in the Drawings. The circular scale on each disc 60 is provided by twenty circumferentially equally spaced marks with the numbers 10, 20, 30, 40 and 50 adjacent appropriate marks as shown in FIG. 3. Also, the outer surface 31 of ring 30 is provided with a reference mark 52, in the form of an arrowhead, adjacent the scale on each disc 60 to allow the operator to determine the amount of rotation of a nut 50 from an initial position thereof for a purpose to be described more fully hereafter.

In accordance with a preferred embodiment, the studs 40 are ½ inch in diameter and are threaded to provide twenty threads per inch. This provides for adjustment of the nuts 50 to be 0.050 inches for one complete turn of a nut 50 and 0.0025 inches for rotation through one of the twenty increments provided by the marks on the scale on a disc 60. The holes 32 in the ring 30 are drilled 1/32 of an inch oversize to provide the clearance necessary for insertion of the studs 40 therethrough. Likewise, the hole in each disc 60 is the same size as its aligned hole 32. The threaded bores 24 in the ends of the soft jaws 20 are also threaded to provide twenty threads per inch in order to threadedly engage the inner ends of the studs 40.

OPERATION

In using the jaw locking means of the invention, the first step is to bolt the three soft jaws 20 to the hard jaws 12 of the chuck by means of the bolts 22. Next the ring 30 is positioned to encircle the soft jaws 20 and the three studs 40 are passed through the holes 32 in the ring 30 and threaded into the threaded bores 24 in the soft jaws 20 to a set position. After this step, the three studs 40 will extend an equal distance from the soft jaws 20 along the axis of movement thereof radially of the chuck center.

The next step is to place the workpiece to be held by the soft jaws 20 within the inner ends thereof and to close the chuck at full pressure.

The next step is to center the ring 30 as concentric as possible relative to the central axis of the chuck. In this step, the nuts 50 (and disc 60) are run down onto the outer ends of the studs 40 to the outer surface 31 of the ring 30. The nuts 50 (and disc 60) are finger tightened onto the outer surface 31 of the ring 30 when the concentric position is achieved.

The next step is for the operator to calculate the amount of metal removal required. After this determination is made, the operator opens the chuck, removes the workpiece and then backs off the nuts 50 on the three studs 40 to the exact number of thousandths to achieve the amount of metal removal desired. The operator can make the desired adjustment of the three nuts 50 by keeping in mind that each increment on the scale on a disc 60 is 0.0025 thousandths of an inch and one complete turn is 0.050 thousandths of an inch. After the nuts 50 have been adjusted, the chuck is closed at full pressure and the nuts 50 will lock the soft jaws 20 exactly where they should be to bore out the surface 26 thereof to fit the workpiece accurately. It will be apparent that nuts 50 "lock" the soft jaws 20 in the desired position by engaging ring 30 at the outer surface 31 thereof to limit the radial inward movement of each stud 40 and the soft jaw 20 secured thereto.

The final step in the operation is to bore out the jaws to fit the workpiece. This step, is of course, well known.

It is noted that, depending on the conditions, the operator may want to achieve the jaw formation in several removal steps. This will permit the operator to have the final boring out step remove only a small amount of metal, as for example, only 0.010 of an inch.

At the end of the procedure described above, the workpiece and the surfaces 26 of the soft jaws 20 are a perfect match. Thus, when the workpiece is placed within the chuck, the soft jaws 20 are closed around the workpiece in a very secure and accurate holding position, and in a manner so as to position the soft jaws 20 very accurately even at very high jaw engaging pressures, such as 10,000 p.s.i. By virtue of the jaw locking means of this invention, it is possible to achieve an extremely good surface contact all the way around the jaw surfaces 26 of each soft jaw 20 in contact with the workpiece. This will result in greater accuracy in the formation of the workpiece.

This invention has been described by reference to precise embodiments but it will be appreciated by those skilled in the art that this concept is subject to variation and modification and to the extent that these are within the skill of the artisan to effect, said variations and modifications are included within the scope of the appended claims.

What is claimed is:

1. For use with a chuck, such a lathe chuck or the like, having a plurailty of hard jaws guided for sliding movement toward and away from a chuck center and radially to the chuck axis by the jaw setting means of the lathe or the like, and a soft jaw secured on top of each of said hard jaws for conjoint movement therewith as a unit radially to the chuck axis, a jaw locking means comprising:

a ring means adapted to be arranged to encircle the soft jaws, said ring means having radially extending holes aligned with the axis of radial movement of said soft jaws, a plurality of studs, one stud associated with each soft jaw and being secured thereto to extend radially outwardly therefrom, each stud extending through an associated radial hole in said ring means to provide a threaded portion projecting radially outwardly from the outer surface of said ring means, and a plurality of nuts, each of said nuts being threadedly engaged on each of said studs at the outwardly projecting portion thereof including means associated with each nut and located on the outer surface of said ring means to provide a scale extending around said nut, including a reference mark for providing an indication of the amount of adjustment of said nut relative to said stud.

2. A jaw locking means according to claim 1 wherein each of said scales is formed on an annular disc secured to the outer surface of said ring means and having a central opening concentric with an associated hole in said ring means and through which said stud extends.

3. A jaw locking means according to claim 2 wherein said threaded portion of each of said studs is threaded to provide twenty threads per inch and said scale is provided with twenty-five circumferentially equally spaced markings.

4. A jaw locking means according to claim 1 wherein said ring means is circular in configuration and said holes are spaced apart 120°.

5. A jaw locking means according to claim 1 wherein said stud is externally threaded throughout the entire length thereof.

6. A jaw locking means according to claim 5 wherein each of said soft jaws is provided with a radially extending threaded bore adapted to be threadedly engaged with the inner end of said studs.

* * * * *